(12) United States Patent
Walker

(10) Patent No.: US 7,240,087 B1
(45) Date of Patent: Jul. 3, 2007

(54) COMMUNICATION NETWORK HAVING ADJUSTABLE RESPONSE TIMEOUTS AND METHOD THEREFORE

(75) Inventor: Anthony Dean Walker, Rougemont, NC (US)

(73) Assignee: International Business Machines Corporation, Armonk, NY (US)

( * ) Notice: Subject to any disclaimer, the term of this patent is extended or adjusted under 35 U.S.C. 154(b) by 1739 days.

(21) Appl. No.: 08/883,710

(22) Filed: Jun. 27, 1997

(51) Int. Cl.
*G06F 15/16* (2006.01)

(52) U.S. Cl. ........................................ 709/200; 714/749
(58) Field of Classification Search ........... 395/185.08; 370/85.8, 280, 668, 509, 252; 379/98; 709/224, 709/200; 371/33; 341/51; 714/749
See application file for complete search history.

(56) References Cited

U.S. PATENT DOCUMENTS

| | | | | |
|---|---|---|---|---|
| 4,569,042 A | | 2/1986 | Larson | 370/13 |
| 4,890,316 A | * | 12/1989 | Walsh et al. | 379/98 |
| 4,965,811 A | | 10/1990 | Sparks | 375/109 |
| 5,193,151 A | | 3/1993 | Jain | 395/200 |
| 5,327,581 A | * | 7/1994 | Goldberg | 455/503 |
| 5,459,837 A | | 10/1995 | Caccavale | 395/184.01 |
| 5,515,363 A | | 5/1996 | Ben-Nun et al. | 370/17 |
| 5,521,907 A | | 5/1996 | Ennis, Jr. et al. | 370/17 |
| 5,563,875 A | | 10/1996 | Hefel et al. | 370/15 |
| 5,566,175 A | | 10/1996 | Davis | 370/84 |
| 5,592,468 A | * | 1/1997 | Sato | 370/252 |
| 5,627,533 A | * | 5/1997 | Clark | 341/51 |
| 5,678,007 A | * | 10/1997 | Hurvig | 709/227 |
| 5,699,511 A | * | 12/1997 | Porcaro et al. | 395/185.08 |
| 5,706,425 A | * | 1/1998 | Unekawa | 395/185.08 |
| 5,710,885 A | * | 1/1998 | Bondi | 709/224 |
| 5,719,882 A | * | 2/1998 | Ellis | 371/33 |
| 5,751,721 A | * | 5/1998 | Bloks | 370/509 |
| 5,796,955 A | * | 8/1998 | Takahashi et al. | 709/232 |
| 5,802,046 A | * | 9/1998 | Scott | 370/280 |
| 5,802,302 A | * | 9/1998 | Waclawsky et al. | 709/224 |
| 5,806,007 A | * | 9/1998 | Raith et al. | 455/574 |
| 5,859,853 A | * | 1/1999 | Carlson | 370/468 |
| 5,896,561 A | * | 4/1999 | Schrader et al. | 455/67 |
| 5,964,837 A | * | 10/1999 | Chao et al. | 709/224 |

OTHER PUBLICATIONS

Raj Jain, "A Timeout-Based Congestion Control Scheme for Window Flow-Controlled Networks", IEEE Journal on Selected Areas in Communications, vol. SAC-4, No. 7, Oct. 1986, pp. 1162-1167.

* cited by examiner

*Primary Examiner*—Thong Vu
(74) *Attorney, Agent, or Firm*—Winstead Sechrest & Minick

(57) ABSTRACT

A communication network implements a timing system that closely approximates network response times so that information may be transmitted between two data processing systems within the network in a timely and efficient manner. During operation of the communication network, a sending data processing system sends query data to a receiving data processing system. A response timer within the sending data processing system is initialized to track the query operation. If the receiving data processing system provides a response to the sending data processing system before the response timer expires, the timing implemented for data communications is proper for the communication network. However, if the receiving data processing system fails to provide a response within a time specified by the response timer, the transmitting data processing system resends a query frame. Subsequently, the sending data processing system in the communication network gradually increases a response time until the time measured by the response timer does not expire before a response is received by the sending data processing system.

9 Claims, 5 Drawing Sheets

COMMUNICATION NETWORK HAVING ADJUSTABLE RESPONSE TIMEOUTS AND METHOD THEREFORE

TECHNICAL FIELD

The present invention relates in general to a communication network, and more particularly, to response timeouts within a communication network.

BACKGROUND INFORMATION

Communication networks allow people and computers to transfer information to one another over great distances and at a timely speed. When this information is transferred across the communication network, the signals are transmitted in compliance with a network protocol established between a sending and a receiving data processing system. Many such network protocols use sequencing to facilitate the transfer of multiple data packets from one data processing system to a second data processing system, where the second data processing system does not provide an acknowledgement back to the first data processing system. In such protocols, the sending data processing system tags each data packet with a sequence number. Receipt of the data packets is effective acknowledged by the receiving data processing system by identifying a sequence number which was last received. When a data packet is lost on the network, the acknowledgement for the lost frames and subsequent frames is not forthcoming from the receiving party.

When a data packet is lost on a network, it is often necessary for a transferring data processing system to resend the data packet. To determine a point at which the data should be resent, many data processing systems use a static default timer. When a static default timer is implemented in a data processing system, a predetermined period of time is set to provide a time period by which an acknowledgment of receipt of data values should be determined. While such systems are adequate, it is desirable for the timer to be more closely tied with an actual network response time so that a data condition may be detected as soon as practical, while cases in which needless queries are made due to slow responses are minimized.

In an attempt to address these issues, some protocols provide for the receiving data processing system to detect that it has missed a packet by detecting a missing sequence number (per the protocol) and output a request for the missed data packet be resent. Alternatively, a receiving data processing system may fail to acknowledge that it has received a data packet with a predetermined sequence number, assigned in compliance with the protocol. In both of these cases, a response timer is implemented. The response timer is active when data packets are outstanding without acknowledgement. Therefore, when this timer expires, the sending data processing system transmits a query frame to the receiving data processing to determine which data packets need to be resent. This query process is costly to execute since no data may be sent from the sending data processing system or the receiving data processing system while the query is outstanding. If the response timer were made to closely reflect the network response times, the query process would be more apt to be executed when needed. However, current implementations of communication networks fail to implement a timer which does closely approximate and reflect network response times within a communications network.

Therefore, a need exists for a communication network having data processing systems which closely track a response time of the network so that data packets may be transmitted and received at the most efficient rates.

SUMMARY OF THE INVENTION

The previously mentioned needs are fulfilled with the present invention. Accordingly, there is provided, in a first form, a method for operating a communication system. The method includes the steps of transmitting a first information frame and selectively receiving a first response in response to transmission of the first information frame. The method also includes the steps of measuring a first amount of time between transmission of the first information frame and receipt of the first response and selectively modifying a response time value in response to the first amount of time.

Additionally, there is provided, in a second form, a method for operating a communication system. The method includes the steps of transmitting a first frame of information and initiating operation of a timer with the first response time. The method also includes the step of determining when a first query response has been received and selectively incrementing the first response time when the first query response has been received.

Furthermore, there is provided, in a third form, a first data processing system for communicating with a second data processing system. A first data processing system includes an interface circuit for transmitting a first information frame and for selectively receiving a first response in response to transmission of the first information frame. The first data processing system also includes a timer for measuring a first amount of time between transmission of the first information frame and receipt of the first response. The timer is connected to the interface circuit. The first data processing system also includes a central processing unit connected to the timer which selectively modifies a response time value in response to the first amount of time.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4-B illustrates, in flow diagram form, a remaining portion of the methodology implemented by FIG. 4-A.

DETAILED DESCRIPTION OF A PREFERRED EMBODIMENT

Figure 1:
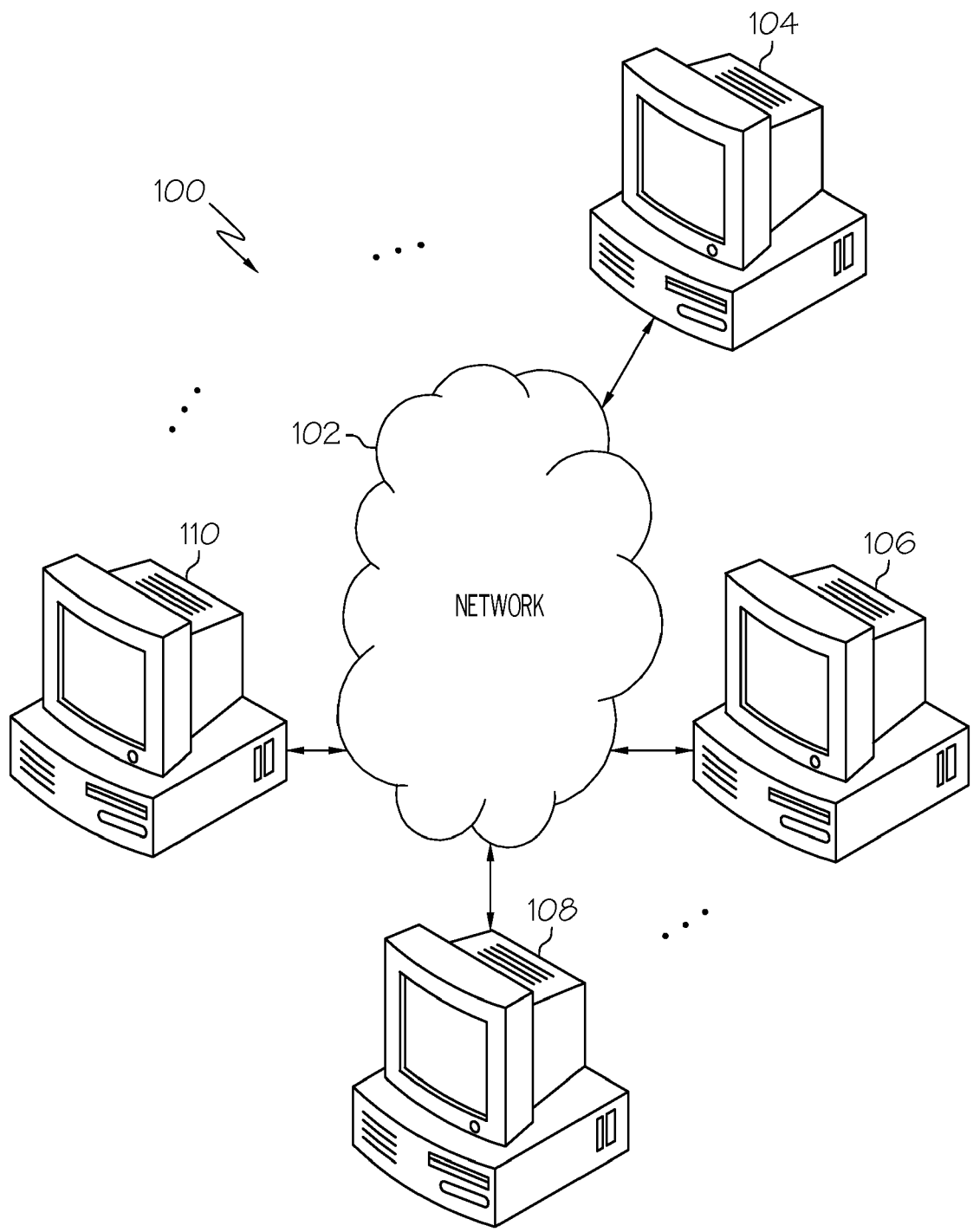
FIG. 1 illustrates, in block diagram form, a communication network, in accordance with one embodiment of the present invention.

The present invention provides a communication network which implements a timing system that closely approximates network response times so that information may be transmitted between two data processing systems within the network in a timely and efficient manner. During operation of the data processing systems of the present invention, a sending data processing system sends query data to a receiving data processing system. At that point, a response timer within the sending data processing system is initialized to track the query operation. If the receiving data processing system provides a response to the sending data processing system before the response timer expires, the timing implemented for data communications is proper for the communication network.

However, in the present invention, if the receiving data processing system fails to provide a response within a time specified by the response timer, the transmitting data processing system must resend a query frame. Subsequently, if the receiving data processing system provides a response after the second query frame is sent by the transmitting data processing system, two possibilities exist for explaining this slow response time. In a first explanation, it is assumed that the communication network lost the first query of the transmitting data processing system. In this situation, the network response time may be very good, but the communication network may have simply lost the first query frame. In a second explanation, it is assumed that the network response time is slow and this lack of timeliness causes the response timer to expire.

The present invention addresses the second possibility by sending query frames using a current value stored within the response timer. After a query response is received, a query timer is initialized and started with a maximum response time and the response timer is stopped. Subsequently, if the query response returns within the maximum response time, this indicates that the response time set by the current implementation is too small and an adjustment should be made. This adjustment is made in timer resolution increments, up to the maximum response time. By selectively increasing the response time used to measure system communications, the present invention more closely tracks the functions of the communication network. Additionally, the transmitting data processing system is operating with an increased response time, as determined by the response timer.

By operating in this manner, the data processing system of the present invention is able to track a network response as the response degrades and becomes slower. In one embodiment to the present invention, a sending data processing system in a communication network gradually increases a response time of a response timer therein until the time measured by the response timer does not expire before a response by the receiving data processing system is received by the sending data processing system. The sending data processing system continues to operate with the increased response time until the increased response time has expired. Furthermore, the system will continue to operate with an increased response time until a future response timer expiration (i.e. lost message) causes a query frame to be sent. If the timers response to the query frame is significantly lower (defined in invention as greater than two times the TIMER RESOLUTION) than the current value of the response timer, the response timer value will be adjusted. No problem exists if the response time is too large as long as frames are not being lost. Therefore, adjusting on the first lost frame after network conditions improve is an acceptable solution. Subsequently, the sending data processing system sends a query frame to determine if the receiving data processing system has provided a response more quickly. If the receiving data processing system provides a response before the response timer expires, this indicates that the response timer of the transmitting data processing system should be decreased for future transmissions.

Operation of the timer tracking mechanism of the present invention will subsequently be described in greater detail.

To describe operation of the present invention, some parameters of an environment in which it was implement will be described herein. First, it should be noted that numerous specific details are set forth in the following description. These numerous specific details are intended to provide a thorough understanding of the present invention. However, it will be obvious to those skilled in the data processing art that the present invention may be practiced without such specific details. In other instances, logic circuits and data processing functions are illustrated in a block diagram form in order not to obscure the present invention in unnecessary detail. Additionally, for the most part, details concerning timing considerations and the like have been omitted inasmuch as such details are not necessary to obtain a complete understanding of the present invention and are within the skills of persons of ordinary skill in the relevant art. Furthermore, during the description of the implementation of the present invention, the terms "assert" and "negate" and various grammatical forms thereof, are used to avoid confusion when dealing with the mixture of "active high" and "active low" logic signals. "Assert" is used to refer to the rendering of a logic signal or registered bit into its active, or logically true state. "Negate" is used to refer to the rendering of a logic signal or register bit into its inactive, or logically false state.

Refer now to FIG. 1 which illustrates a communication network 100 in accordance with one embodiment of the present invention. Communication network 100 comprises a network 102 and a plurality of data processors 104 through 110. Each of the plurality of data processors 104 through 110 is bidirectionally coupled to network 102 to communicate information with one another, as well as other data processing elements not illustrated herein. Operation of such a communication network is well known to those of skill in the relevant art and, therefore, will not be described in greater detail herein. It should be noted that a communication protocol which allows network 102 to communicate with each of data processors 104 through 110 may be implemented as a wireless or wireline communication network.

Furthermore, the present invention is applicable to many types of applications, including internet applications which utilize internet transfer protocols. Alternatively, network 102 may communicate with each of data processors 104 through 110 using a protocol referred to as an HDLC, High Level Data Link Control. Additionally, a particular protocol within the HDLC protocol includes a CDPD (Cellular Digital Pocket Data) wireless network protocol. This wireless protocol is referred to as MDLP, Mobile Data Link Protocol. MDLP is also based on HDLC. In the alternative, it should be noted that any communication protocol may be implemented on the present invention.

Figure 2:
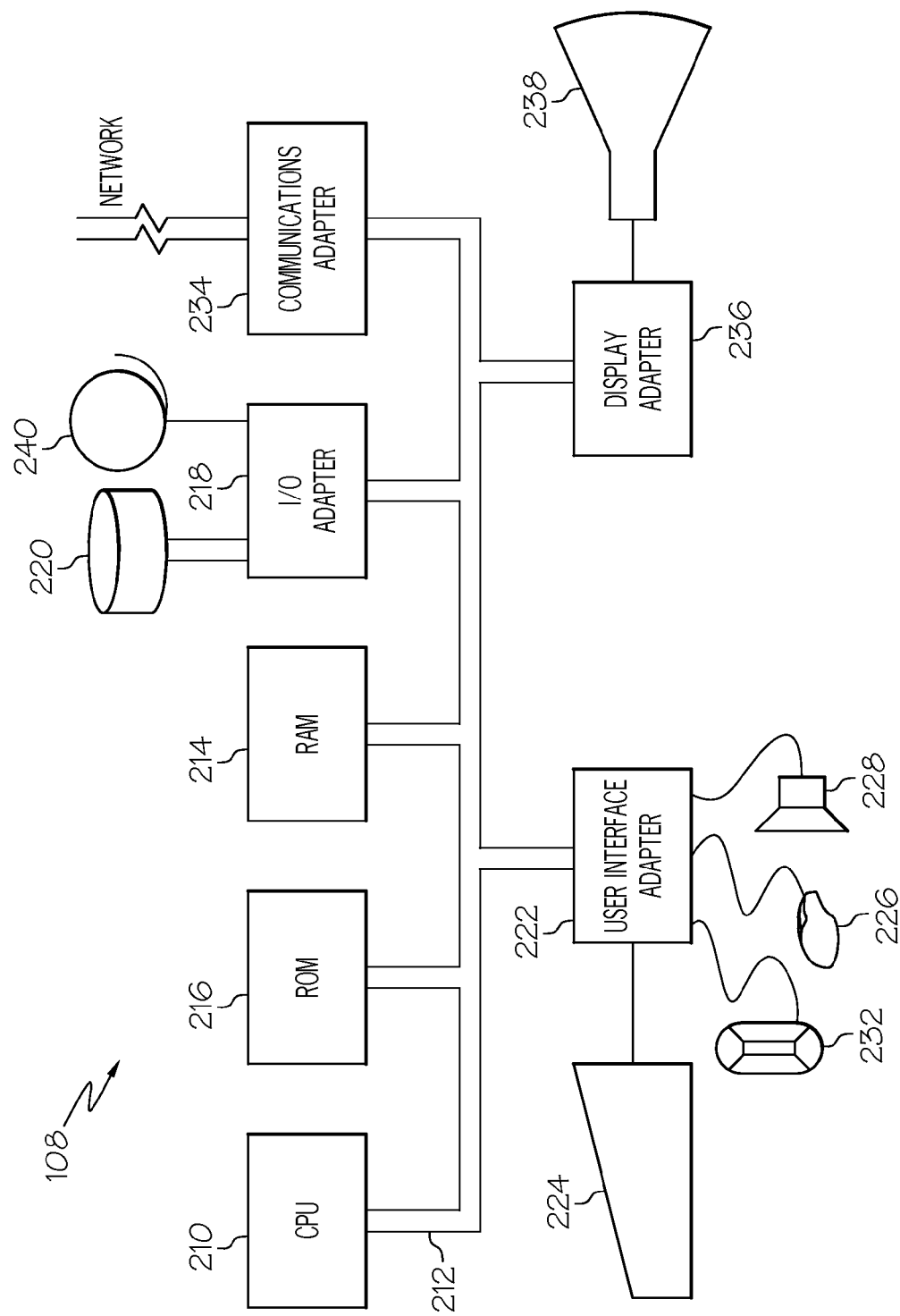
FIG. 2 illustrates, in block diagram form, a data processing system in accordance with one embodiment of the present invention.

FIG. 2 illustrates data processing system 108 in greater detail. Referring first to FIG. 2, an example is shown of a data processing system 108 which may be used for the invention. The system has a central processing unit (CPU)

210, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The history buffer (not shown) of the present invention is included in CPU 210. The CPU 210 is coupled to various other components by system bus 212. Read only memory ("ROM") 216 is coupled to the system bus 212 and includes a basic input/output system ("BIOS") that controls certain basic functions of the data processing system 108. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communication with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system throughout the keyboard 224, trackball 232 or mouse 226 and receiving output from the system via speaker 228 and display 238. Additionally, an operating system such as AIX ("AIX" is a trademark of the IBM Corporation) is used to coordinate the functions of the various components shown in FIG. 2.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 3:
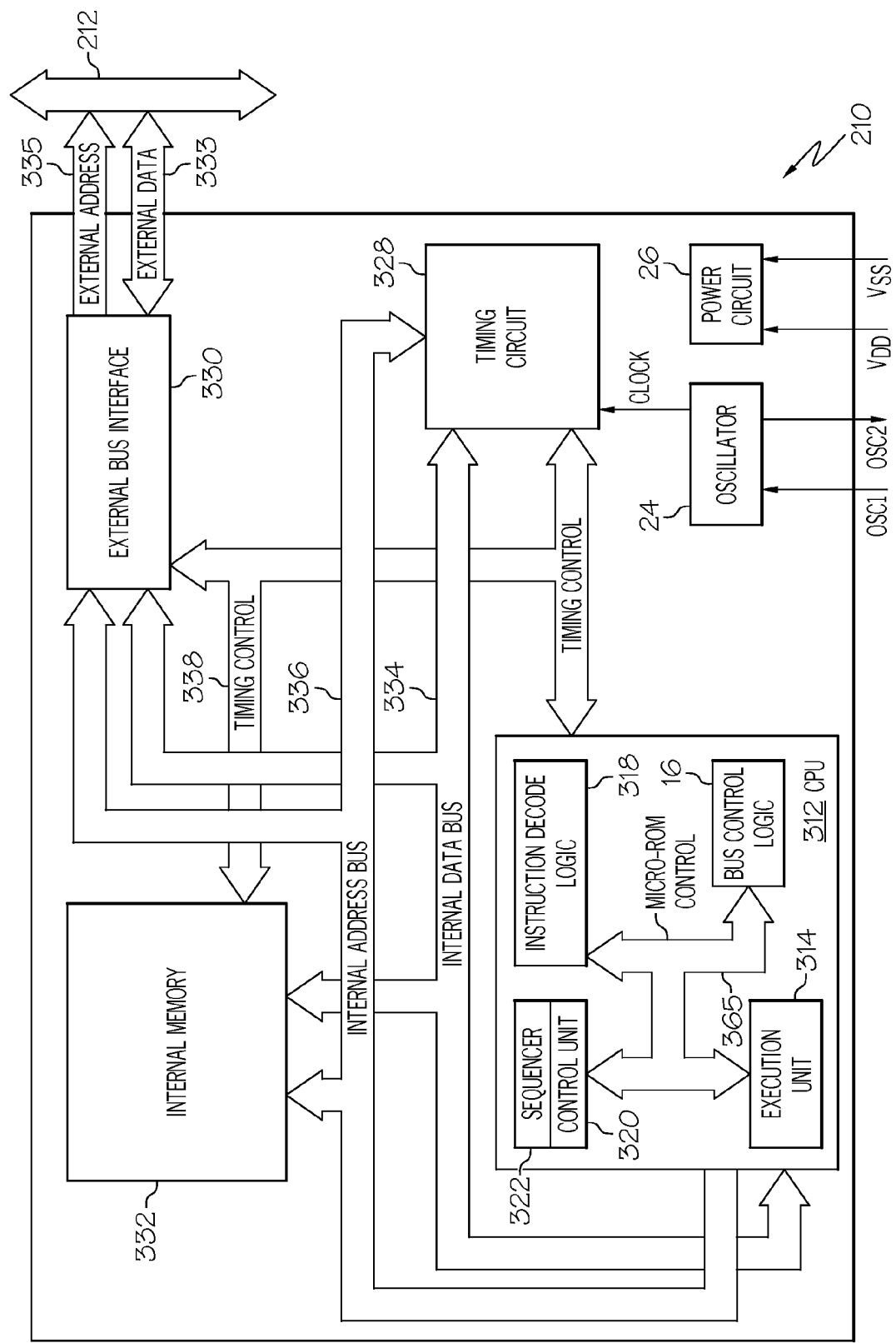
FIG. 3 illustrates, in block diagram form, a portion of a central processing unit of the data processing system of FIG. 2.

FIG. 3 illustrates a portion of CPU 210 in accordance with one embodiment of the present invention. The portion of CPU 210 illustrated in FIG. 3 generally comprises a central processing unit (CPU) 312, oscillator 324, a power circuit 326, a timing circuit 328, an external bus interface 330, and an internal memory 332. CPU 312 generally comprises an execution unit 312, a bus control logic circuit 312, and instruction decode logic circuit 312, a control unit 320, and a sequencer 322.

During operation of the portion of CPU 210 illustrated in FIG. 3, an "OSC 1" signal is provided to oscillator 324 via an external source, such as a crystal. The crystal is connected between the OSC 1 and OSC 2 signals to enable the crystal to oscillate. The OSC 1 signal provides a "clock signal" signal to a remaining portion of CPU 210. Operation of the crystal oscillators is well known in the data processing art and should be apparent to one with ordinary skill in that art.

Similarly, power circuit 326 receives both a "VDD" and a "VSS" signal from an external power source. The VDD signal provides a positive voltage and the VSS signal provides a reference, or ground, voltage. The VDD and VSS signals are provided to each of the remaining components of the portion of CPU 210 illustrated in FIG. 3. The routing of these signals is well known in the data processing art, and, therefore, should be well-known to one with ordinary skill in the art.

Timing circuit 328 receives a Clock signal and subsequently provides appropriate timing signals in response to the methodology implemented by the present invention to each of CPU 312, external bus center interface 330, and internal memory 332 via a Timing Control bus 338.

Furthermore, during operation, plurality of address values are provided from external bus interface 330 via an External Address bus 335. Similarly, a plurality of data values are communicated to external bus interface bus 330 via an External Data bus 333. External bus interface 330 functions to communicate address and data values between an external user and data processing system 310. A plurality of address and data values are communicated between external bus interface 330 and a remaining portion of CPU 210 via an Internal Address bus 336 and an Internal Data bus 334, respectively. Internal memory 332 functions to store information values necessary for the proper operation of data processing system 10. Additionally, other data values may be stored therein as specified in a user program.

CPU 312 executes each of the instructions required during operation of the portion of CPU 210. Internal Address bus 336 and Internal Data bus 334 communicate information between execution unit 314 and a remaining portion of CPU 210. Bus control logic circuit 316 fetches instructions and operands. Each of the instructions is then decoded by instruction decode logic circuit 318 and provided to control unit 320 and sequencer 322. Control unit 320 and sequencer 322 maintain a sequence of execution of each of the instructions to most sufficiently utilize the computing capabilities of data processing system 108. Additionally, control unit 320 includes a micro-ROM memory (not shown), which provides a plurality of control information to each of execution unit 314, bus control logic 316, and instruction decode logic 318 via a micro-ROM control bus 365.

Figure 4A:
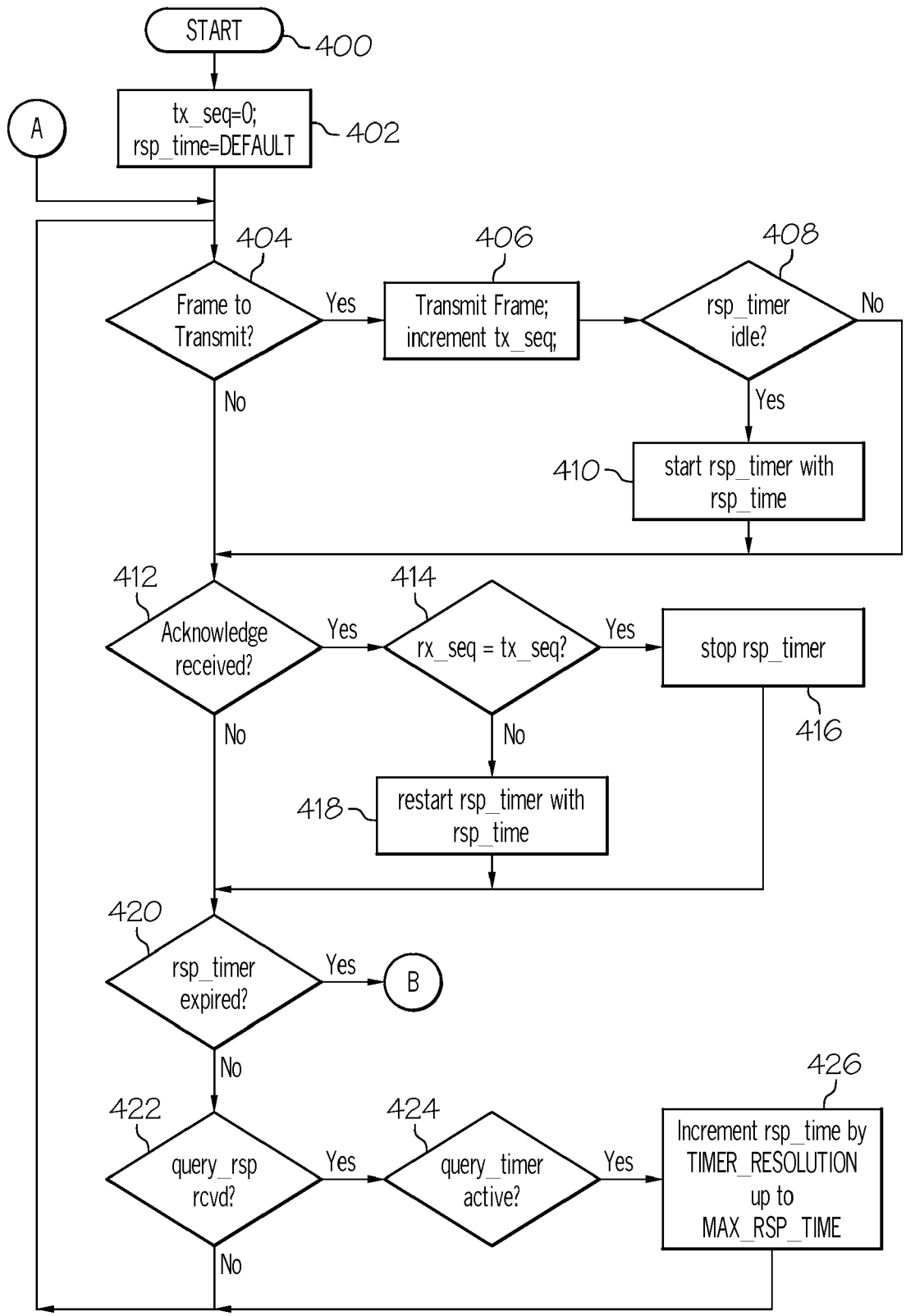
FIG. 4-A illustrates, in flow diagram form, a set of steps which implement one embodiment of the present invention.
Figure 4B:
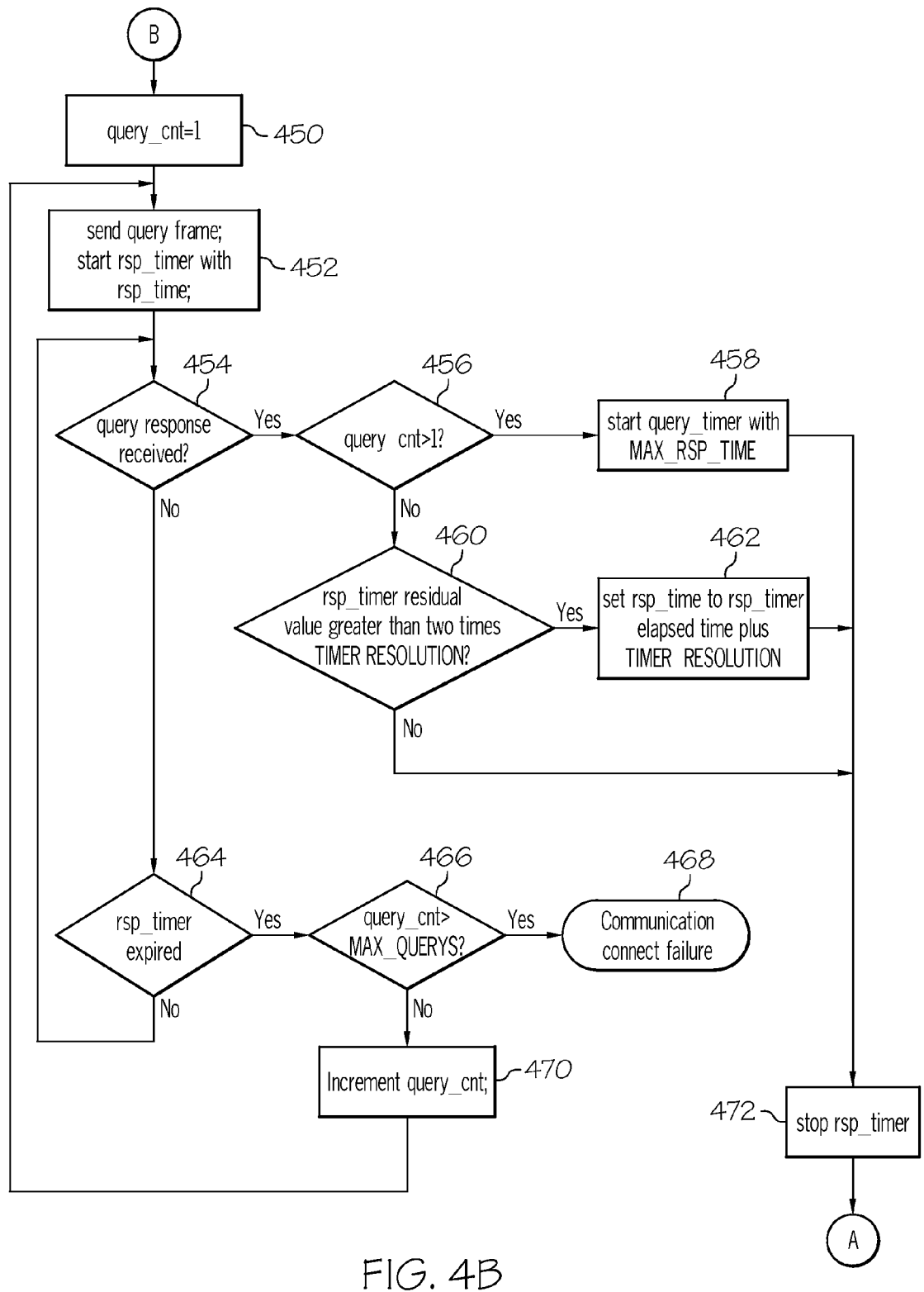

During operation, data processing system 108, under the control of CPU 210, executes a methodology illustrated in FIGS. 4-A and 4-B. In a step 402 of FIG. 4-A, CPU 210 is initialized for operation. In a first step 402, CPU 210 sets a transmit sequence (tx_seq) value to zero and sends a response time (rsp_time) equal to a default value. It should be noted that the "tx_seq" value and the "rsp_time" value may be stored in registers within execution unit 314 of CPU 312 or within a register space of internal memory 332. Next, execution unit 314 determines whether a frame of information should be transmitted from CPU 210 via external bus interface 330 in response to an application or protocol being executed. If a frame of information is available for transmission, CPU 312 provides the appropriate data values to be transmitted via communications adapter 234 in a step 406. Additionally, in step 406, the "tx_seq" value is incremented by execution unit 314.

Subsequently, execution unit 314 provides control signals to timing circuit 328 via timing control bus 338 to determine whether a response timer is idle. Note that in FIGS. 4-A and 4-B, the response timer is implemented by timing circuit 328 and is referred to with the label "rsp_timer." If the response timer is not idle, a program flow returns to step 412. However, if the response timer is idle, CPU 312 provides the appropriate control signals to enable the response timer with a response time (rsp_time) value in a step 410. During a first pass through the program flow implemented by FIGS. 4-A and 4-B, the response time (rsp_time) value is set to a default value. As previously mentioned, the default (DEFAULT) value corresponds to a predicted amount of time required to receive a response from another data processing system within a network.

In step 412, execution unit 314 provides control signals which determine whether an acknowledge signal has been received from the receiving data processing system. If an acknowledge has been received, step 414 is executed to determine whether a receive sequence number corresponds to a transmit sequence number. If the receive sequence number does correspond to the transmit sequence number, a step 416 is executed and the response timer is idled within timing circuit 328. However, if the received sequence number is not the same as the transmit sequence number, the response timer within timing circuit 328 is re-initialized with the response time (rsp_time) value in step 418.

Next, CPU 312 determines whether a response time value has expired in a step 420. It should be noted that the response timer value has expired when the response time equals the default value in a first pass of the methodology of the present invention. If the response timer value has expired, a program flow of the present invention goes to step 450 of FIG. 4-B. FIG. 4-B will subsequently be described in greater detail. However, if the response timer value has not expired, step 422 is executed to determine whether a query response (query_rsp) has been received. It should be noted that a query response is a response to the query frame sent and provides a predetermined or a specially defined value. In contrast, an acknowledge is a signal transferred to indicate that data has been transmitted correctly. If the query response is received from the receiving data processing system and the query timer is still active, the response time is incremented by a TIMER RESOLUTION value up to a maximum response time (MAX_RSP_TIME) in a step 426. A program flow subsequently returns to step 404.

When the response timer expires in step 420, a program flow goes to step 450. In step 450, a query count (query_cnt) value is set to a one value. Subsequently, a query frame is sent and the response timer is started with the response time value in a step 452. Step 454 determines whether a query response was received from the receiving data processing system. If the query response was received, a query count value (query_cnt) is then tested in a step 456. If the query count value is greater than one, then the query timer is initialized with the maximum response time (MAX_"rsp_time") in a step 458. It should be noted that the query timer of the present invention is implemented by timing circuit 328 of FIG. 3. Subsequently, the response timer is idled in a step 472.

However, if the response timer residual value is greater than two times the timer resolution, then the response time is set to a value equal to the response timer elapsed time plus the timer resolution (TIMER_RESOLUTION) value in a step 462. Subsequently, the response timer is idled in step 472. Additionally, if the response timer residual value is not greater than two times the timer resolution, the response timer is idled in step 472.

Should no query response be received in step 454, step 464 determines whether the response timer has expired. If the response timer has expired, the query count value is tested in a step 466. If the query count value is greater than the maximum number of queries (MAX_QUERYS), then this indicates that a communication connection failure occurred and the information is provided to software controlling operation of data processing system 108 in a step 468. However, if the query count value is not greater than the maximum number of queries, the query count value is incremented in a step 470. A program flow of the present invention subsequently returns to step 452.

While there have been described herein the principles of the invention, it is to be clearly understood to those skilled in the art that this description is made by way of example only and not as a limitation to the scope of the present invention. Accordingly, it is intended, by the appended claims, to cover all modifications of the invention that fall within the true spirit and scope of the invention.

What is claimed is:

1. A method for operating a communication system, comprising the steps of:
   transmitting a first information frame;
   selectively receiving a first response in response to transmission of the first information frame;
   measuring a first amount of time between transmission of the first information frame and receipt of the first response;
   selectively modifying a response time value in response to the first amount of time, wherein said step of measuring a first amount of time between transmission of the first information frame and receipt of the first response uses a timer operating in response to a clock, and wherein said response time value is a response time value of said timer; and
   incrementing an initial response time value by a timer resolution value, to form the response time value.

2. The method of claim 1 wherein the initial response time value is incremented up to a maximum response time value.

3. The method of claim 1 wherein the initial response time value is a default value.

4. A method for operating a communication system, comprising the steps of:
   transmitting a first frame of information;
   initiating operation of a timer with a first response time;
   determining when a first query response has been received; and
   selectively incrementing the first response time when the first query response has been received;
   wherein the first response time is incremented by a timer resolution value.

5. A method for operating a communication system, comprising the steps of:
   transmitting a first frame of information;
   initiating operation of a timer with a first response time;

determining when a first query response has been received;

selectively incrementing the first response time when the first query response has been received;

setting a transmit sequence value when the first frame of information is transmitted;

initiating operation of a response timer when the first information frame is transmitted;

comparing the transmit sequence value and a receive sequence value when the first response is received; and idling operation of the response timer when the transmit sequence value corresponds to the receive sequence value.

6. The method of claim 5, further comprising the steps of:

restarting operation of the response timer when the transmit sequence value differs from the receive sequence value.

7. A method for operating a communication system comprising the steps of:

transmitting a first frame of information;

initiating operation of a timer with a first response time;

determining when a first query response has been received;

selectively incrementing the first response time when the first query response has been received;

transmitting a second information frame;

selectively receiving a second response in response to transmission of the second information frame;

measuring a second amount of time between transmission of the second information frame and receipt of the second response;

selectively initializing a query timer with a maximum response time value; and selectively modifying the response time value to correspond to a residual time value remaining in a response timer after the second amount of time has passed.

8. The method of claim 7 wherein the response time value is selectively modified to equal the residual time value plus a timer resolution value.

9. A first data processing system for communicating with a second data processing system, comprising:

interface means for transmitting a first information frame and for selectively receiving a first response in response to transmission of the first information frame;

a timer for measuring a first amount of time between transmission of the first information frame and receipt of the first response, the timer being coupled to the interface means;

a central processing unit coupled to the timer for selectively modifying a response time value in response to the first amount of time; and means for incrementing the response timer value by a preselected time period in response to the first amount of time.

\* \* \* \* \*